United States Patent
Song et al.

(10) Patent No.: US 9,052,725 B1
(45) Date of Patent: Jun. 9, 2015

(54) APPARATUS AND METHOD FOR CONTROLLING POWER SUPPLIED TO CIRCUITS BASED ON TIME DELAY TO PRODUCE DATA

(71) Applicant: QUALCOMM Incorporated, San Diego, CA (US)

(72) Inventors: Hui William Song, Toronto (CA); Mohamed Hassan Abu-Rahma, Mountain View, CA (US); Esin Terizioglu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/082,077

(22) Filed: Nov. 15, 2013

(51) Int. Cl.
G05F 5/00 (2006.01)
G06F 1/32 (2006.01)

(52) U.S. Cl.
CPC ............... *G05F 5/00* (2013.01); *G06F 1/3203* (2013.01)

(58) Field of Classification Search
CPC .. G06F 1/3296; G06F 1/3203; Y02B 60/1285
USPC ......... 327/540, 513, 530, 538, 541, 543, 544, 327/545
See application file for complete search history.

(56) References Cited

U.S. PATENT DOCUMENTS

| 6,014,749 | A | 1/2000 | Gloor et al. |
|---|---|---|---|
| 8,407,025 | B2 | 3/2013 | Blaauw et al. |
| 8,407,492 | B2 | 3/2013 | Friddell |
| 8,598,944 | B2 * | 12/2013 | Fukuda et al. ............... 327/530 |
| 2012/0117402 | A1 | 5/2012 | Machnicki et al. |

OTHER PUBLICATIONS

Gu-Yeon Wei, "Energy-Efficient I/O Interface Design with Adaptive Power-Supply Regulation," Dissertation, Jun. 2001, 132 pages.

* cited by examiner

*Primary Examiner* — Jung Kim
(74) *Attorney, Agent, or Firm* — Novak Druce Connolly Bove + Quigg LLP (57) ABSTRACT

An apparatus and method for controlling power supplied to data generating circuits based on performance, such as time delay associated with generating data. The apparatus includes a plurality of data generating circuits configured to generate data at respective outputs in response to a first signal; a plurality of timing circuits configured to generate a plurality of second signals related to time delays between the first signal initiating the generation of the data and an appearance of the data at the respective outputs of the data generating circuits; a power supply circuit configured to generate a voltage for supplying power to the data generating circuits; a power controller configured to control the voltage generated by the power supply circuit based on the plurality of second signals; and a serial data transfer circuit configured to serial transfer the plurality of second signals from the respective timing circuits to the power controller.

22 Claims, 8 Drawing Sheets

APPARATUS AND METHOD FOR CONTROLLING POWER SUPPLIED TO CIRCUITS BASED ON TIME DELAY TO PRODUCE DATA

FIELD

This disclosure relates, in general, to power control apparatuses, and in particular, to an apparatus and method for controlling power supplied to data generating circuits based on time delay between the request for the data and the production of the data.

BACKGROUND

Integrated circuits (ICs) are continuously designed to consume less power. One of the driving factors for reducing power consumption is that many of these integrated circuits are being used in portable devices. Portable devices are usually powered by limited power sources, such as batteries. The time for operating these devices on a continuous basis is based on the capacity of the batteries used and the power consumption of the devices. In order to further prolong the time for continuously use of such portable devices, these devices are continuously being designed to consume power more efficiently.

Another consideration with respect to integrated circuits is the performance of circuits at various regions of an IC chip. Generally, due to process variations, circuits at various regions of an IC chip may perform at different levels of performance, even if the circuits are similarly designed. Additionally, due to temperature variations across integrated circuits, similar circuits at various regions of an IC chip may also perform at different levels of performance.

The performance of circuits in an integrated circuit is typically affected by the voltage supplied to the circuits. In order to reduce the power consumption of integrated circuits, the voltage supplied to the circuits in an integrated circuit may be lowered. However, the voltage should not be lowered below a level that would cause one or more of the circuits to perform below a specified level. In other words, the voltage should not be lowered below a level that would cause the worst case performing circuit to perform below a specified level.

Thus, there is a need for a technique of monitoring a performance of a circuit, and control (e.g., reduce) the voltage supplied to the circuit to achieve a desired tradeoff between power consumption and performance.

SUMMARY

An aspect of the disclosure relates to an apparatus for controlling a voltage supplied to a plurality of data generating circuits based on the performance of the circuits. In particular, the apparatus comprises a plurality of data generating circuits configured to generate data at respective outputs in response to a first signal; a plurality of timing circuits configured to generate a plurality of second signals related to time delays between the first signal initiating the generation of the data and an appearance of the data at the respective outputs of the data generating circuits; a power supply circuit configured to generate a voltage for supplying power to the data generating circuits; a power controller configured to control the voltage generated by the power supply circuit based on the plurality of second signals; and a serial data transfer circuit configured to serially transfer the plurality of second signals from the respective timing circuits to the power controller.

In another aspect of the disclosure, one or more of the data generating circuits comprise a memory circuit. In still another aspect, the first signal comprises a clock signal. In yet another aspect, the initiation of the generation of the data is responsive to a transition of the clock signal.

In another aspect of the disclosure, the power controller is configured to control the voltage based on a largest among the time delays as indicated by the plurality of second signals. In still another aspect, the serial data transfer circuit comprises a plurality of cascaded shift registers configured to serially transfer the second signals from the respective timing circuits to the power controller. In yet another aspect, the power controller is configured to control the serial data transfer circuit to serially receive the plurality of second signals.

In another aspect of the disclosure, the data generating circuits are respectively implemented at distinct regions of a single integrated circuit. In still another aspect, the plurality of data generating circuits comprise substantially the same type of memory circuits.

In another aspect of the disclosure, the power controller is configured to control the voltage generated by the power supply circuit based on a defined criterion. In still another aspect, the defined criterion comprises all of the time delays being at or below a time delay threshold.

In another aspect of the disclosure, one or more of the timing circuits comprises a time-to-digital converter (TDC) including a start input configured to receive the first signal, a stop input configured to receive at least one bit of the data at the output of the corresponding data generating circuit, and a delay output at which the corresponding second signal is generated.

In another aspect of the disclosure, the apparatus further comprises a scheduler configured to initiate the power controller to control the voltage based on the second signals, wherein the scheduler is configured to initiate the power controller on a timing basis.

In another aspect of the disclosure, the apparatus further comprises an environmental sensor configured to initiate the power controller to control the voltage based on the second signals, wherein the environmental sensor is configured to initiate the power controller based on a sensed environmental condition. In still another aspect, the sensed environmental condition relates to a temperature or a temperature change at one or more regions of an integrated circuit.

Other aspect of the disclosure relates to apparatus, components, modules, devices, encoded computer-readable storage mediums, and other elements configured to achieve the operations in accordance with the aforementioned method. In general, other aspects, advantages and novel features of the present disclosure will become apparent from the following detailed description of the disclosure when considered in conjunction with the accompanying drawings.

The word "exemplary" is used herein to mean "serving as an example, instance, or illustration." Any aspect described herein as "exemplary" is not necessarily to be construed as preferred or advantageous over other aspects."

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Figure 1:
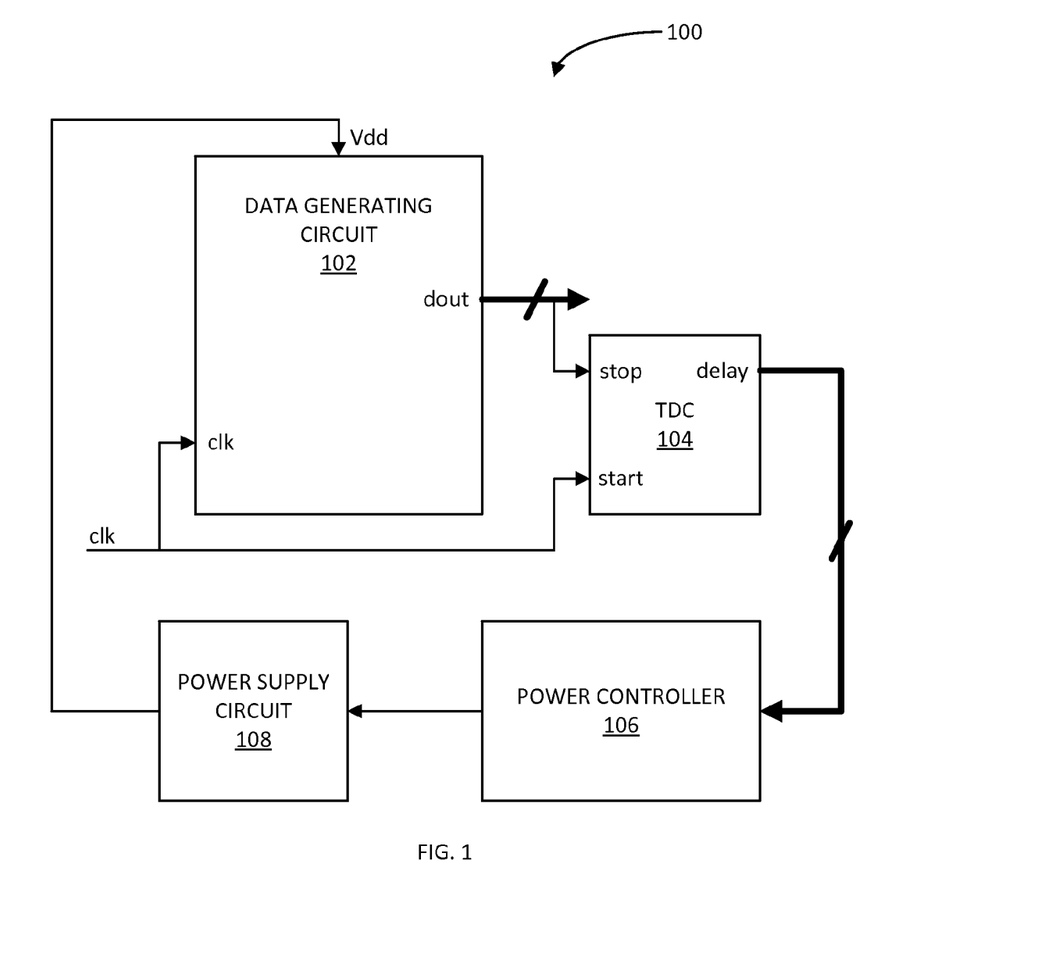
FIG. 1 illustrates a block diagram of an exemplary apparatus for controlling power supplied to a data generating circuit in accordance with an aspect of the disclosure.

FIG. 1 illustrates a block diagram of an exemplary apparatus 100 for controlling power supplied to a data generating circuit in accordance with an aspect of the disclosure. The apparatus 100 comprises a data generating circuit 102, a time-to-digital converter (TDC) 104, a power controller 106, and a power supply circuit 108.

The data generating circuit 102 is configured to produce data at an output "dout" in response to a clock signal clk. For instance, the data generating circuit 102 may be configured to produce data at the output dout in response to a transition (e.g., a leading or trailing edge) of a substantially square wave clock signal clk. As discussed further herein, an example of the data generating circuit 102 may be a memory circuit.

The time-to-digital converter (TDC) 104 is configured to generate a signal at a "delay" output related to a time delay between the clock signal clk initiating the generation of the data at the output dout and the appearance of the data at the output dout (referred to herein as the "data propagation delay"). Stated differently, the time-to-digital converter (TDC) 104 is measuring a performance of the data generating circuit 102. The time-to-digital converter (TDC) 104 may be configured as a timer including a start input, a stop input, and a delay output. The start input is configured to receive the clock signal clk. The stop input is configured to receive a bit (any of the bits) from the output dout of the data generating circuit 102. And, the timer 104 generates the signal related to the time delay between the initiating of the generation of data and the appearance of the data at the output dout at the delay output.

The clock signal clk initiates the generation of the data by the data generating circuit 102, and at substantially the same time, initiates the timer 104. In response to the data generating circuit 102 producing the data at the output dout, and further that the bit coupled to the stop input of the timer 104 transitions from a logic zero to a logic one and/or from a logic one to a logic zero, the timer 104 stops. The delay between the initiation of the data and the appearance of the data at the output dout is generated at the delay output of the timer 104. The resulting delay is provided to the power controller 106. If the outputting of the data by the data generating circuit 102 does not cause the sensed bit to transition, the delay output of timer 104 is ignored by the power controller 106. One or more subsequent measurement cycles initiated by the clock signal clk may cause the sensed bit to transition; and consequently, the resulting delay may be read by the power controller 106 for power adjustment purposes. The time-to-digital converter (TDC) 104 may be configured to in-situ monitor the data generating circuit 102, while the circuit 102 is being operated for its intended purpose.

The power controller 106 is configured to control a voltage Vdd generated by the power supply circuit 108 based on the resulting time delay generated by the time-to-digital converter (TDC) 104. For instance, the power controller 106 may control the power supply circuit 108 to generate the voltage Vdd based on a specified criteria. For example, the specified criteria may be to achieve a specified time delay as measured by the time-to-digital converter (TDC) 104. The power controller 106 may use other criteria for setting the voltage Vdd. As illustrated, the voltage Vdd supplies power to the data generating circuit 102. Thus, the data generating circuit 102 may be operated in a power efficient manner by reducing the voltage Vdd to a level at which the specified performance or data propagation delay of the data generating circuit 102 is met.

Figure 2:
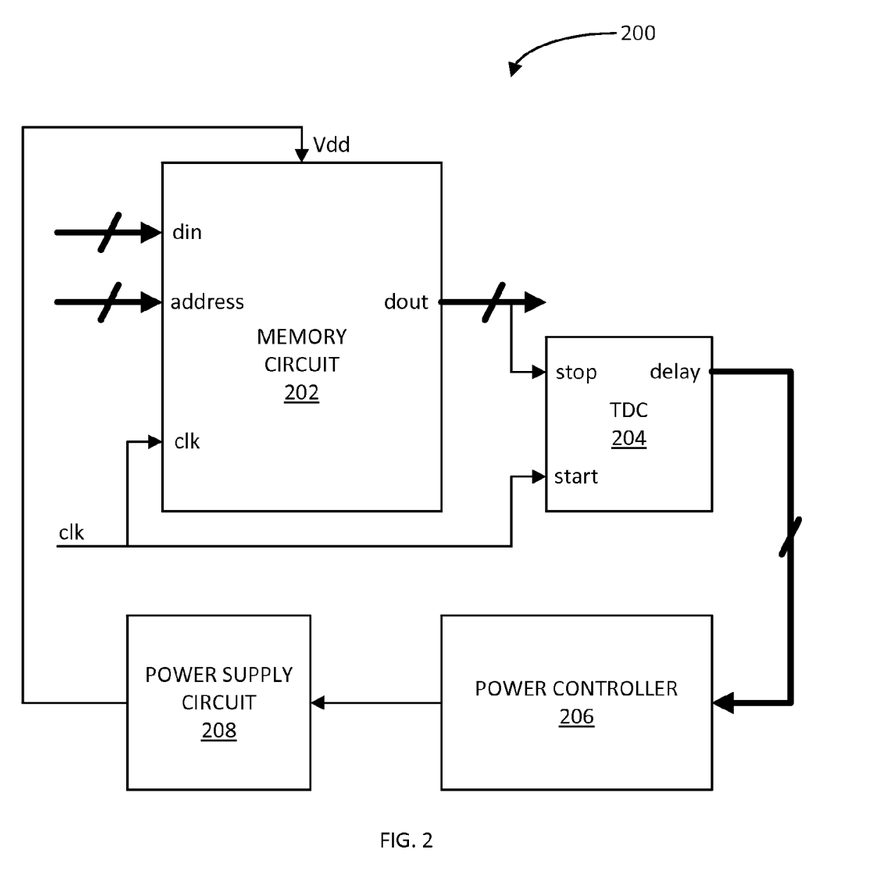
FIG. 2 illustrates a block diagram of an exemplary apparatus for controlling power supplied to a memory circuit in accordance with another aspect of the disclosure.

FIG. 2 illustrates a block diagram of another exemplary apparatus 200 for supplying power to a memory circuit in accordance with another aspect of the disclosure. The apparatus 200 is similar to that of apparatus 100 previously discussed, except that the data generating circuit is a memory circuit. In particular, the apparatus 200 comprises a memory circuit 202, a time-to-digital converter (TDC) 204, a power controller 206, and a power supply circuit 208.

The memory circuit 202 comprises an input "din" for receiving data to be stored in the memory circuit. The memory circuit 202 further comprises an input "address" for receiving an address that specifies the location of data to be written to or read from. Additionally, the memory circuit 202 comprises an input "clk" for receiving a clock signal clk, which controls the timing of writing data to or reading data from the memory circuit. Also, the memory circuit 202 includes an output "dout" at which data due to a reading operation is produced.

The remaining elements, the time-to-digital converter (TDC) 204, power controller 206, and power supply circuit 208, operate in a similar manner as that of time-to-digital converter (TDC) 104, power controller 106, and power supply circuit 108, previously discussed. That is, the time-to-digital converter (TDC) 204 measures the time delay between the initiation of the reading of the data from the memory circuit 202 by the clock signal clk, and the appearance of the data at the output dout of the memory circuit 202. The resulting time delay is provided to the power controller 206. The power controller 206 controls the power supply circuit 208 to generate a voltage Vdd based on the resulting time delay. The voltage Vdd supplies power to the memory circuit 202. The power controller 206 may further control the voltage Vdd based on a criteria, such as to achieve a specified data propagation delay for the memory circuit 202. In a like manner, the memory circuit 202 may be operated in a power efficient manner by reducing the voltage Vdd to a level at which the specified performance or data propagation delay of the memory circuit 202 is met.

Figure 3:
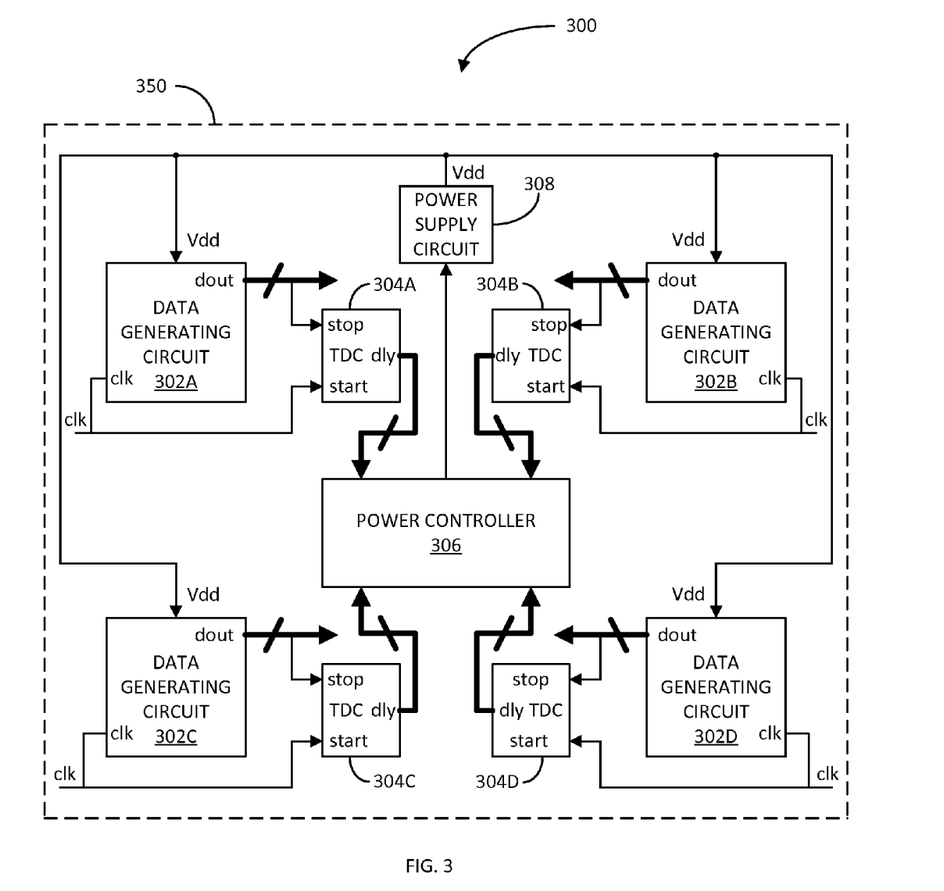
FIG. 3 illustrates a block diagram of an exemplary apparatus for controlling power supplied to a plurality of data generating circuits in accordance with another aspect of the disclosure.

FIG. 3 illustrates a block diagram of another exemplary apparatus 300 for controlling power supplied to a plurality of data generating circuits in accordance with another aspect of the disclosure. In this example, the respective performances of data generating circuits are monitored to control a common voltage Vdd used for supplying power to data generating circuits. For instance, the voltage Vdd may be reduced such that the data generating circuit that has the worst case performance is able to meet the desired or specified performance (e.g., at or below a data propagation delay threshold). The apparatus 300 is thus capable of minimizing the power consumed by data generating circuits, while ensuring that the specified performance is met by all of the data generating circuits.

In particular, the apparatus 300 comprises a plurality of data generating circuits 302A, 302B, 302C, and 302D. In this example, there are four (4) data generating circuits. However, it shall be understood that the apparatus 300 may comprise two or more data generating circuits. The data generating circuits 302A-D may be all of the same type with designed performance to be substantially the same. The apparatus 300 further comprises a plurality of time-to-digital converters (TDCs) 304A, 304B, 304C, and 304D. For example, there may be one time-to-digital converter (TDC) for each data generating circuit. Additionally, the apparatus 300 further comprises a power controller 306 and a power supply circuit 308. The apparatus 300 may be implemented on a single integrated circuit 350, and the data generating circuits 302A, 302B, 302C, and 302D may be located at significantly distinct regions of the integrated circuit 350, such that there may be performance differences among the data generating circuits due to process and temperature variations across the chip.

As in the previous embodiments, each time-to-digital converter (TDC) is configured to measure the time delay between an initiation of the generation of the data and the appearance of the data at an output dout of the corresponding data generating circuit (e.g., the data propagation delay). Thus, time-to-digital converter (TDC) 304A is configured to measure the data propagation delay of data generating circuit 302A; time-to-digital converter (TDC) 304B is configured to measure the data propagation delay of data generating circuit 302B; time-to-digital converter (TDC) 304C is configured to measure the data propagation delay of data generating circuit 302C; and time-to-digital converter (TDC) 304D is configured to measure the data propagation delay of data generating circuit 302D. As previously discussed, the time-to-digital converters (TDCs) 304A-D may be configured to measure the data propagation delay of the data generating circuits 302A-D, while the latter are being used for their intended purposes (e.g., in-situ monitoring).

The power controller 306 receives the resulting time delays from the time-to-digital converters (TDCs) 304A-D, and controls the power supply circuit 308 based on the resulting time delays. For instance, the power controller 306 may control the power supply circuit 308 to generate a voltage Vdd that supplies power to the data generating circuits 302A-D, such that the largest or worst case delay is at or below a specified delay threshold. Accordingly, the power controller 306 may ensure that substantially the minimum power is supplied to the data generating circuit 302A-D that results in all of the data generating circuits 302A-D meeting the specified data propagation delay. This allows the apparatus 300 to be operated in a power efficient manner. The power controller 306 may occasionally (e.g., periodically or in accordance with another time basis) measure the data propagation delays of the data generating circuits 302A-D to ensure that they are all performing within specification during operation.

Figure 4:
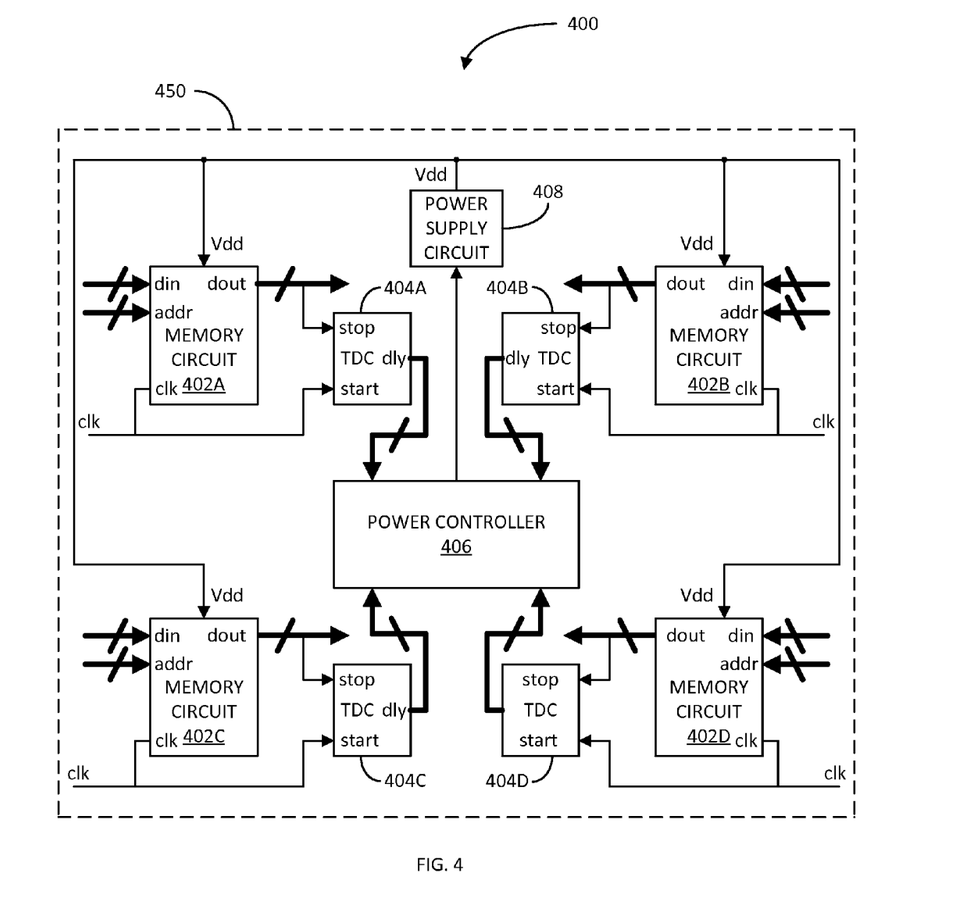
FIG. 4 illustrates a block diagram of an exemplary apparatus for controlling power supplied to a plurality of memory circuits in accordance with another aspect of the disclosure.

FIG. 4 illustrates a block diagram of another exemplary apparatus 400 for controlling power supplied to a plurality of memory circuits in accordance with another aspect of the disclosure. The apparatus 400 is similar to the apparatus 300 previously discussed, except that the data generating circuits are memory circuits. In particular, the apparatus 400 comprises a plurality of memory circuits 402A-D, a plurality of time-to-digital converters (TDCs) 404A-D, a power controller 406, and a power supply circuit 408. The apparatus 400 may be implemented on a single integrated circuit 450, whereby the memory circuits 402A-D are located at significantly distinct regions of the integrated circuit 450 that may cause them to have different performances due to process and temperature variations across the IC chip.

As in the previous embodiments, the memory circuits 402A-D may be operated for its intended purposes (e.g., for storing and/or retrieving data). When data is read from the memory circuits 402A-D, the time-to-digital converters (TDCs) 402A-D determine the corresponding data propagation delays, i.e., the respective time delays between the initiation of a reading operation by the clock signal clk and the appearance of the data at the outputs dout of the memory circuits. The resulting time delays are provided to the power controller 406. The power controller 406, in turn, controls the power supply circuit 408 to generate a voltage Vdd for powering the memory circuits 402A-D based on the resulting time delays from the time-to-digital converters (TDCs) 404A-D, respectively.

As in the previous embodiments, the power controller 406 may control the voltage Vdd so that the apparatus 400 is operated in a power efficient basis. For instance, the power controller 406 may set the voltage Vdd to a minimum value that would cause the worst case performing memory circuit to operate within specification. That is, the power controller 406 may set the voltage Vdd so that the worst case data propagation delay as measured by the time-to-digital converters (TDCs) 404A-D is at or below a maximum time delay threshold. This allows the apparatus 400 to be operated in a power efficient manner. The power controller 406 may occasionally (e.g., periodically or in accordance with another time basis) measure the data propagation delays of the data generating circuits 402A-D to ensure that they are all performing within specification during operation.

Figure 5:
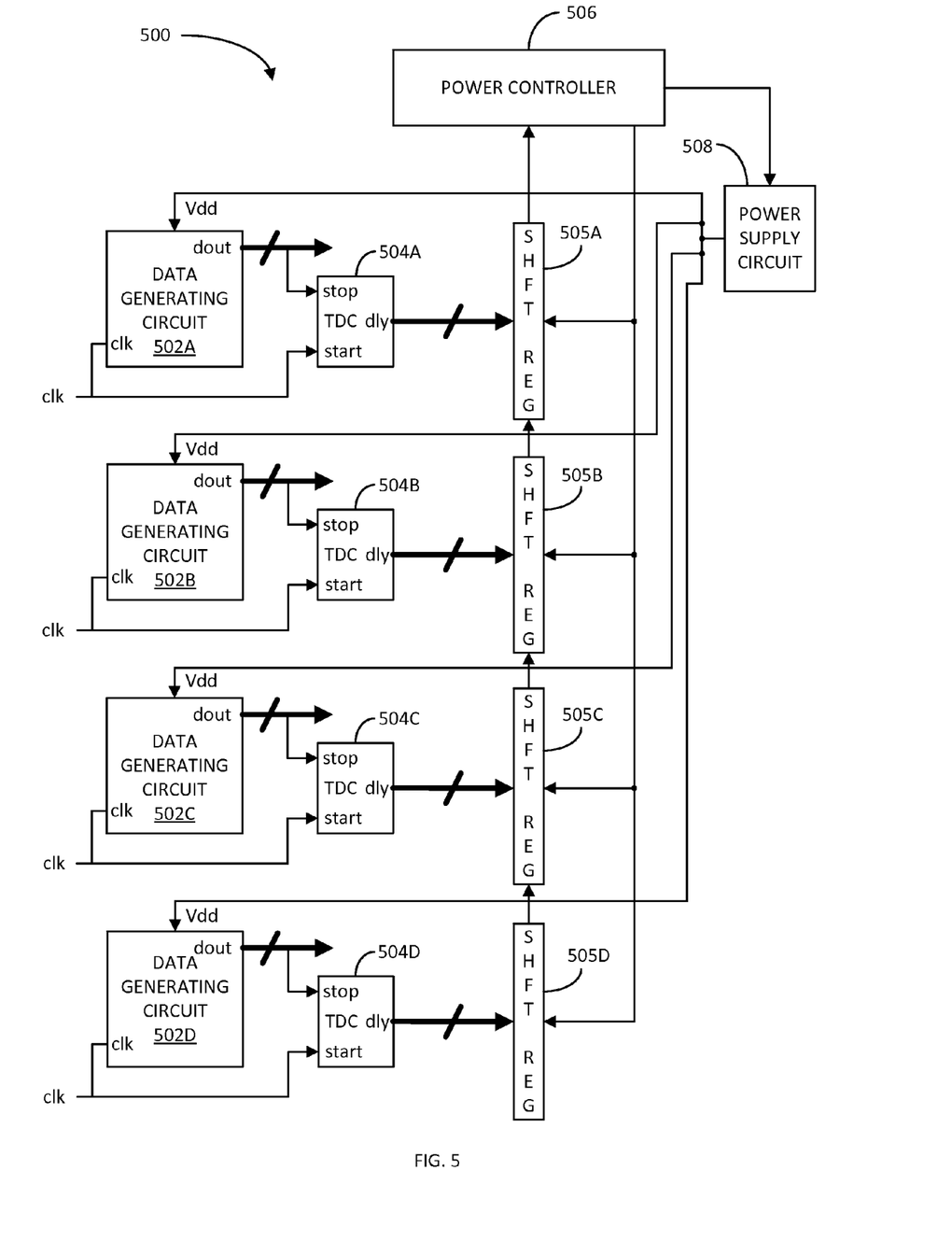
FIG. 5 illustrates a block diagram of another exemplary apparatus for controlling power supplied to a plurality of data generating circuits including a serial data transfer component in accordance with another aspect of the disclosure.

FIG. 5 illustrates a block diagram of another exemplary apparatus 500 for controlling power supplied to a plurality of data generating circuits in accordance with another aspect of the disclosure. The apparatus 500 is similar to that of apparatus 300, except that it includes shift registers to serially transfer the time delay data to the power controller. This reduces the complexity of metallization routing in integrated circuits that implement such an apparatus 500. In particular, the apparatus 500 comprises a plurality of data generating circuits 502A-502D, a plurality of time-to-digital converters (TDCs) 504A-504D, a plurality of shift registers 505A-505D, a power controller 506, and a power supply circuit 508.

As in the previous embodiments, the data generating circuits 502A-502D are operated for its intended purposes.

While the data generating circuits 502A-D are being operated for its intended purposes, the time-to-digital converters (TDCs) 504A-D measure the data propagating delays for the data generating circuits 502A-D, respectively. As previously discussed, the data propagating delays are the respective time delays between the initiation of the generation of the data and the appearance of the data at the outputs dout of the data generating circuits 502A-502D. The time-to-digital converters (TDCs) 504A-504D provide the measured time delays to the shift registers 505A-505D, respectively. The power controller 506 may control the shift registers 505A-D to serially receive the time delay data from the shift registers 505A-D. The power controller 506 may control the shift registers 505A-D to occasionally (e.g., on a periodic or other time basis) receive the time delay data to update the voltage Vdd generated by the power supply circuit 508 on an as needed basis. As in the previous embodiments, the voltage Vdd supplies power to the data generating circuits 502A-D.

Similarly, the power controller 506 may control the voltage Vdd so that the apparatus 500 is operated in a power efficient basis. For instance, the power controller 506 may set the voltage Vdd to a minimum value that would cause the worst case performing data generating circuit to operate within specification. That is, the power controller 506 may set the voltage Vdd so that the worst case data propagation delay as measured by the time-to-digital converters (TDCs) 504A-D is at or below a maximum time delay threshold. This allows the apparatus 500 to operate in a power efficient manner.

Figure 6:
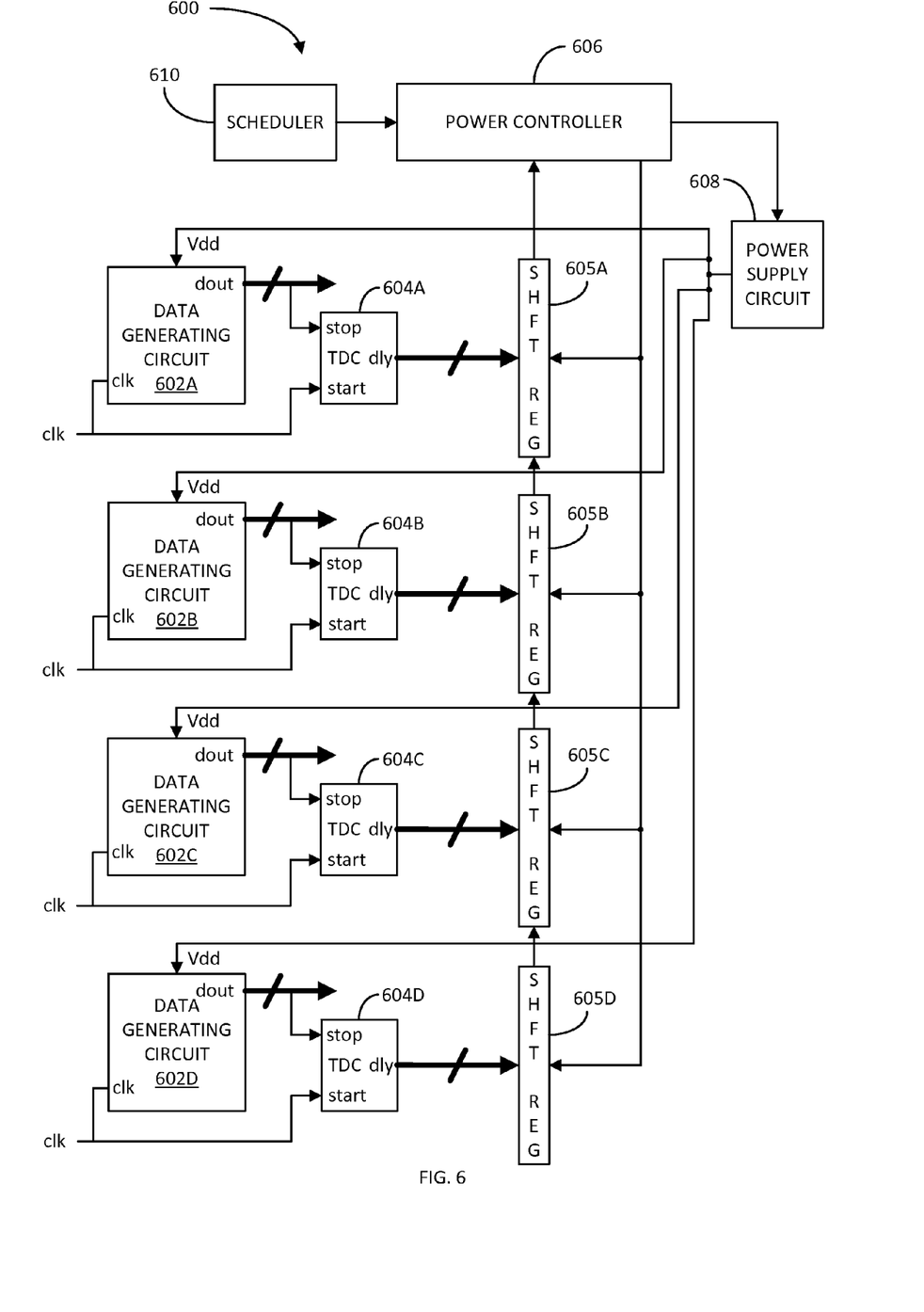
FIG. 6 illustrates a block diagram of another exemplary apparatus for controlling power supplied to a plurality of data generating circuits including a serial data transfer component and a timer component in accordance with another aspect of the disclosure.

FIG. 6 illustrates a block diagram of another exemplary apparatus 600 for controlling power supplied to a plurality of data generating circuits in accordance with another aspect of the disclosure. The apparatus 600 is similar to apparatus 500 previously discussed, and includes many of the same elements, including data generating circuits 602A-D, time-to-digital converters (TDCs) 604A-D, shift registers 605A-D, power controller 606, and power supply circuit 608. Additionally, the apparatus 600 comprises a scheduler 610 configured to schedule measurements of the data propagation delays of the data generating circuits 602A-D for the purpose of controlling the power supplied to the circuits 602A-D.

As previously discussed, the time-to-digital converters (TDC) 604A-D measure the time delays between the request for outputting the data as initiated by the clock signal clk and the appearance of the data at the outputs dout of the data generating circuits 602A-D, respectively. The resulting time delays are produced at the outputs delay of the time-to-digital converters (TDC) 604A-D, respectively. The scheduler 610 informs the power controller 606 when to access the time delay data, and control the power supply circuit 608 for the purpose of controlling the power supplied to the data generating circuits 602A-D.

Accordingly, in response to a schedule signal from the scheduler 610, the power controller 606 causes the shift registers 605A-605-D to serially shift the time delay data from the time-to-digital converters (TDC) 604A-D to the power controller 606. The power controller 606 then instructs the power supply circuit 608 to generate a voltage Vdd based on the measured data propagation delays of the data generating circuits 602A-D, respectively. As previously discussed, the power controller 606 may instruct the power supply circuit 608 to generate a voltage Vdd that would result in the worst case data propagation delay to be at or below a specified threshold. This allows the apparatus 600 to be operated in a power efficient manner. It shall be understood that the power controller 606 may control the voltage Vdd based on one or more of the time delay data from the data generating circuits 602A-D for other purposes.

Figure 7:
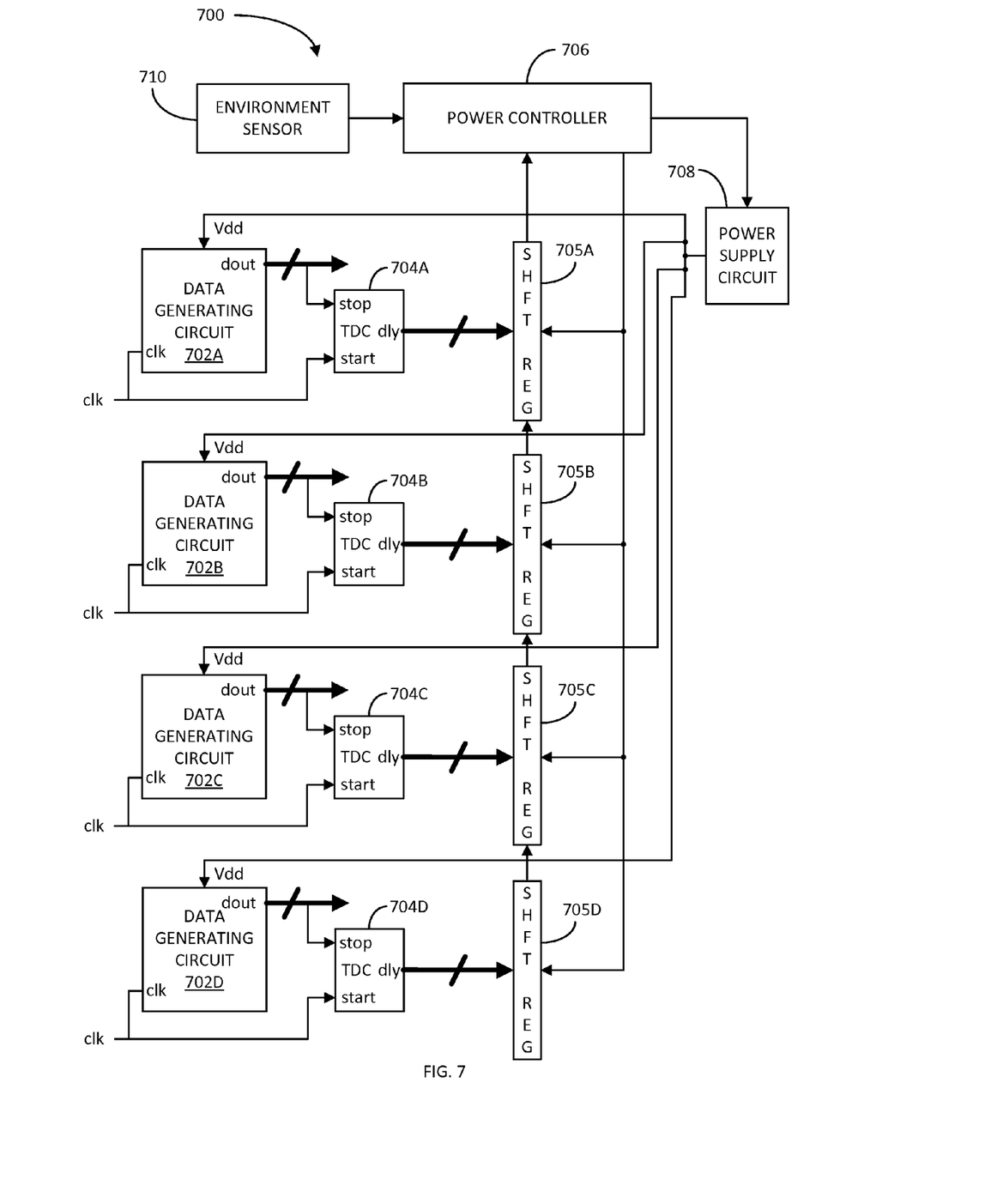
FIG. 7 illustrates a block diagram of another exemplary apparatus for controlling power supplied to a plurality of data generating circuits including a serial data transfer component and an environment sensing component in accordance with another aspect of the disclosure.

FIG. 7 illustrates a block diagram of another exemplary apparatus 700 for controlling power supplied to a plurality of data generating circuits in accordance with another aspect of the disclosure. The apparatus 700 is similar to apparatus 600 previously discussed, and includes many of the same elements, including data generating circuits 702A-D, time-to-digital converters (TDCs) 704A-D, shift registers 705A-D, power controller 706, and power supply circuit 708. The apparatus 700 differs from the apparatus 600 in that the scheduler 610 is replaced by an environment sensor 710 to initiate a power adjustment cycle by the power controller 706 in response to an environmental condition sensed by the environment sensor 710.

Similar to the previous embodiment, the time-to-digital converters (TDC) 704A-D measure the time delays between the request for outputting the data as initiated by the clock signal clk and the appearance of the data at the outputs dout of the data generating circuits 702A-D, respectively. The resulting time delays are produced at the outputs delay of the time-to-digital converters (TDC) 704A-D, respectively. In response to sensing a defined environment condition change or abnormality thereof, the environment sensor 710 instructs the power controller 706 to perform a performance measurement (e.g., a data propagation delay measurement) of the data generating circuits 702A-D, and set the voltage Vdd based on the performance measurements.

For example, the environment sensor 710 may sense the temperature of the integrated circuit upon which the apparatus 700 is implemented, and if the sensed temperature exceeds a defined threshold, the environment sensor 710 instructs the power controller 706 to perform a power adjustment measurement. Alternatively, or in addition to, the environment sensor 710 may sense a temperature change from a previously recorded temperature, and if the temperature change exceeds a defined threshold, the environment sensor 710 instructs the power controller 706 to perform a power adjustment measurement. It shall be understood that the environment sensor 710 may sense other parameters that may affect the performance of the data generating circuits 702A-D.

In response to receiving an instruction to perform a power adjustment cycle from the environment sensor 710, the power controller 706 causes the shift registers 705A-D to serially shift the time delay data from the time-to-digital converters (TDC) 704A-D to the power controller 706. The power controller 706 then instructs the power supply circuit 708 to generate a voltage Vdd based on the measured data propagation delays of the data generating circuits 702A-D, respectively. As previously discussed, the power controller 706 may instruct the power supply circuit 708 to generate a voltage Vdd that would result in the worst case data propagation delay to be at or below a specified threshold. This allows the apparatus 700 to be operated in a power efficient manner. It shall be understood that the power controller 706 may control the voltage Vdd based on one or more of the time delay data from the data generating circuits 702A-D for other purposes.

Figure 8:
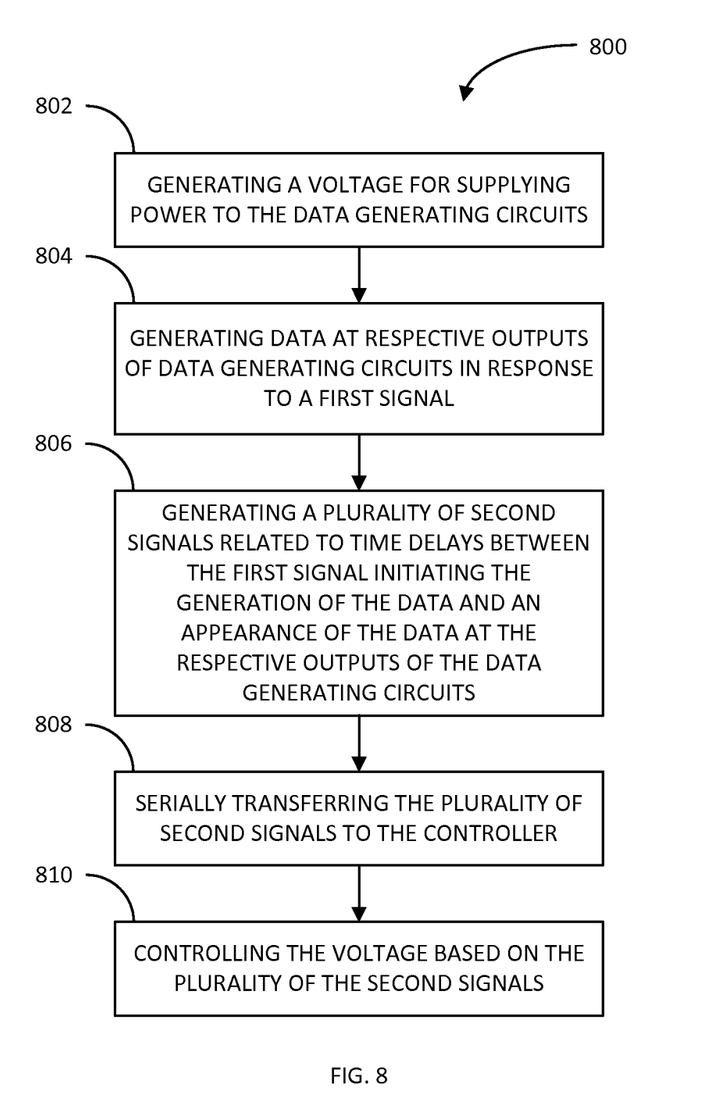
FIG. 8 illustrates a flow diagram of an exemplary method of controlling power supplied to a plurality of data generating circuits in accordance with another aspect of the disclosure.

FIG. 8 illustrates a flow diagram of an exemplary method 800 of controlling power supplied to a plurality of data generating circuits in accordance with another aspect of the disclosure. The method 800 comprises generating a voltage for supplying power to the data generating circuits (block 802). Additionally, the method 800 comprises generating data at respective outputs of a plurality of data generating circuits in response to a first signal (block 804). The method 800 further comprises generating a plurality of second signals related to time delays between the first signal initiating the generation of the data and an appearance of the data at the respective outputs of the data generating circuits (block 806). Also, the method 800 comprises serially transferring the plurality of second signals to the controller (block 808). And, the method 800 comprises controlling the voltage based on the plurality of the second signals (block 810).

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Also, it should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" used in the description or the claims means "A or B or C or any combination of these elements."

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Those of skill in the art understand that information and signals may be represented using any of a variety of different technologies and techniques. For example, any data, instructions, commands, information, signals, bits, symbols, and chips referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

A processing system may include hardware, software, firmware or any combination thereof. The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. In some aspects, a computer-readable medium comprises codes executable to perform one or more operations as taught herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An apparatus, comprising:
    a plurality of data generating circuits, wherein each of the data generating circuits is configured to generate data at a respective output in response to a first signal;
    a plurality of timing circuits assigned to the plurality of data generating circuits, respectively, wherein each of the timing circuits is configured to measure a time delay between the first signal initiating the generation of the data of the respective data generating circuit and an appearance of the data at the output of the respective data generating circuit;
    a power supply circuit configured to generate a voltage for supplying power to the data generating circuits;
    a power controller configured to control the voltage generated by the power supply circuit based on the plurality of measured time delays; and
    a serial data transfer circuit configured to serially transfer the plurality of measured time delays from the respective timing circuits to the power controller.

2. The apparatus of claim 1, wherein one or more of the data generating circuits comprise a memory circuit.

3. The apparatus of claim 1, wherein the first signal comprises a clock signal.

4. The apparatus of claim 3, wherein initiating the generation of the data is in response to a transition of the clock signal.

5. The apparatus of claim 1, wherein the power controller is configured to control the voltage based on a largest among the measured time delays.

6. The apparatus of claim 1, wherein the serial data transfer circuit comprises a plurality of cascaded shift registers configured to serially transfer the measured time delays from the respective timing circuits to the power controller.

7. The apparatus of claim 1, wherein the power controller is configured to control the serial data transfer circuit to serially transfer the plurality of measured time delays.

8. The apparatus of claim 1, wherein the plurality of data generating circuits are respectively implemented at distinct regions of a single integrated circuit.

9. The apparatus of claim 1, wherein the plurality of data generating circuits comprise substantially the same type of memory circuits.

10. The apparatus of claim 1, wherein the power controller is configured to control the voltage generated by the power supply circuit based on a defined criterion.

11. The apparatus of claim 10, wherein the defined criterion comprises all of the measured time delays being at or below a time delay threshold.

12. The apparatus of claim 1, wherein one or more of the timing circuits comprises a time-to-digital converter (TDC) including a start input configured to receive the first signal, a stop input configured to receive at least one bit of the data at the output of the corresponding data generating circuit, and a delay output at which the corresponding measured time delay is output.

13. The apparatus of claim 1, further comprising a scheduler configured to initiate the power controller to control the voltage based on the second signals, wherein the scheduler is configured to initiate the power controller on a timing basis.

14. The apparatus of claim 1, further comprising an environmental sensor configured to initiate the power controller to control the voltage based on the measured time delays wherein the environmental sensor is configured to initiate the power controller based on a sensed environmental condition.

15. The apparatus of claim 14, wherein the sensed environmental condition relates to a temperature or a temperature change at one or more regions of an integrated circuit.

16. A method, comprising:
    for each one of a plurality of data generating circuits, performing the steps of:
        generating data at an output of the respective data generating circuit in response to a first signal; and
        measuring a time delay between the first signal initiating the generation of the data and an appearance of the data at the output of the respective data generating circuit;
    generating a voltage for supplying power to the data generating circuits;
    controlling the voltage based on the plurality of measured time delays; and
    serially transferring the plurality of measured time delays for the purpose of controlling the voltage.

17. The method of claim 16, wherein generating the voltage is based on a largest among the measured time delays.

18. The method of claim 16, wherein serially transferring the plurality of second signals comprises operating a plurality of cascaded shift registers to serially transfer the measured time delays.

19. The method of claim 16, wherein measuring the time delays comprises operating a plurality of respective timing circuits, wherein one or more of the timing circuits comprise a time-to-digital converter (TDC) including a start input configured to receive the first signal, a stop input coupled to at least a portion of the output of the corresponding data generating circuit, and a delay output at which the corresponding measured time delay is output.

20. An apparatus, comprising:
    for each one of a plurality of data generating circuits,
        means for generating data at an output of the respective data generating circuit in response to a first signal; and
        means for measuring a time delay between the first signal initiating the generation of the data and an appearance of the data at the output of the respective data generating circuit;
    means for generating a voltage for supplying power to the data generating means;
    means for controlling the voltage based on the measured time delays; and
    means for serially transferring the plurality of measured time delays to the controlling means.

21. The apparatus of claim 15, wherein the environmental sensor is configured to initiate the power controller to control the voltage if the temperature is above a predetermined threshold.

22. The apparatus of claim 15, wherein the environmental sensor is configured to initiate the power controller to control the voltage if the temperature change is above a predetermined threshold.

* * * * *